United States Patent
Lee et al.

(10) Patent No.: US 9,390,545 B2
(45) Date of Patent: Jul. 12, 2016

(54) APPARATUS AND METHOD FOR TRAVERSING HIERARCHICAL ACCELERATION STRUCTURE

(71) Applicant: Samsung Electronics Co., Ltd., Suwon-si (KR)

(72) Inventors: Jae Don Lee, Yongin-si (KR); Young Sam Shin, Hwaseong-si (KR); Won Jong Lee, Seoul (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 13/870,073

(22) Filed: Apr. 25, 2013

(65) Prior Publication Data

US 2013/0342528 A1    Dec. 26, 2013

Related U.S. Application Data

(60) Provisional application No. 61/642,619, filed on May 4, 2012.

(30) Foreign Application Priority Data

Jun. 26, 2012  (KR) ........................ 10-2012-0068424

(51) Int. Cl.
*G06T 15/06*  (2011.01)

(52) U.S. Cl.
CPC ...................................... *G06T 15/06* (2013.01)

(58) Field of Classification Search
None
See application file for complete search history.

(56) References Cited

U.S. PATENT DOCUMENTS

| 7,190,376 | B1 * | 3/2007 | Tonisson ................. G06T 11/60 345/629 |
| 7,755,628 | B2 | 7/2010 | Reshetov et al. |
| 2003/0018652 | A1 * | 1/2003 | Heckerman ....... G06F 17/30713 |
| 2010/0188396 | A1 | 7/2010 | Mejdrich et al. |

FOREIGN PATENT DOCUMENTS

| KR | 10-2008-0020198 | 3/2008 |
| KR | 10-2009-0020924 | 2/2009 |

* cited by examiner

*Primary Examiner* — Said Broome
(74) *Attorney, Agent, or Firm* — NSIP Law

(57) ABSTRACT

An apparatus and method for traversing a hierarchical acceleration structure may determine whether a current traversal node is a leaf node, may calculate a first distance from the current traversal node to a pop level and a second distance from a root node to the pop level when the current traversal node is the leaf node, and may determine a hierarchical traversal restarting position by comparing the first distance and the second distance.

17 Claims, 6 Drawing Sheets

FIG. 2

```
CAST-RAY(ray)
1   node ← ROOT
2   trail ← (0,0,...)
3   level ← 0
4   popLevel ← NONE
5   while true
6     while node is not leaf do
7       intersect ray against children of node
8       if both children were intersected then
9         near ← child with smaller t_min along the ray
10        far ← child with greater t_min along the ray
11        level ← level + 1
12        if trail[level] = 1 then
13          node ← far
14        else
15          node ← near
16          PUSH(far)
17        end if
18      else if one child was intersected then
19        level ← level + 1
20        if level ≠ popLevel then
21          trail[level] ← 1
22          node ← the child that was intersected
23        else
24          level ← level - 1
25          Pop()
26        end if
27      else
28        Pop()
29      end if
30    end while
31    intersect ray against primitives in node
32    shorten ray at end if cloer primitives found
33    Pop()
34  end while
```

```
Pop()
1   popLevel ← largest i where i <= level and trail[i] = 0
2   trail[popLevel] ← 1
3   trail[i] ← 0 for all i > popLevel
4   if trai[0] = 1 then terminate traversal
5   if shot stack is exhausted then
6     distance ← level - popLevel
7     if (distance <= popLevel) then
8       while (dist >0) do
9         node ← parent of node
10        distance ← distance - 1
11      end while
12      node ← sibling of node
13      level ← popLevel
14    else
15      node ← ROOT
16      level ← 0
17    endif
18  else
19    node ← pop short stack
20    level ← popLevel
21  else if
```

```
float bounds[2][3];
:
node *parent;
node *l_child;
node *r_child;
```

APPARATUS AND METHOD FOR TRAVERSING HIERARCHICAL ACCELERATION STRUCTURE

CROSS-REFERENCE TO RELATED APPLICATIONS

This application claims the priority benefit of U.S. Provisional Application No. 61/642,619, filed on May 4, 2012 in the U.S. Patent and Trademark Office, and of Korean Patent Application No. 10-2012-0068424, filed on Jun. 26, 2012, in the Korean Intellectual Property Office, the disclosures of which are incorporated herein by reference.

BACKGROUND

1. Field

The following description relates to an apparatus and method for traversing a hierarchical acceleration structure in ray tracing.

2. Description of the Related Art

A ray tracing method is a method of creating an image by tracing a path of light incident along a ray toward each pixel of an image from a camera viewpoint.

The ray tracing method reflects physical properties of light, such as reflection, refraction, and penetration, for example, in the rendering result, and thus, may create a high quality image.

The ray tracing method is widely used in three-dimensional (3D) rendering fields of movies and animations in which rendering is performed for a more realistic scene.

Compared to a rasterization method of creating an image while projecting a 3D object onto a screen, a calculation process of the ray tracing method is relatively complex and slow, and thus, has been regarded as a non-real-time rendering method. However, with the development in hardware and through research on a hierarchical data structure for accelerating an intersection calculation, a real-time ray tracing method has been enabled.

SUMMARY

The foregoing and/or other aspects are achieved by providing an apparatus for traversing a hierarchical acceleration structure, the apparatus including a determining unit to determine whether a current traversal node is a leaf node; a calculating unit to calculate a first distance from the current traversal node to a pop level and a second distance from a root node to the pop level when the current traversal node is the leaf node; and a control unit to determine a hierarchical traversal restarting position by comparing the first distance and the second distance.

When the first distance is less than the second distance, the control unit may determine the current traversal node as the hierarchical traversal restarting position.

When the second distance is less than the first distance, the control unit may determine the root node as the hierarchical traversal restarting position.

When the first distance is less than the second distance, the control unit may control hierarchical traversal to be performed from the current traversal node toward a pop node positioned at the pop level.

When the first distance is less than the second distance, the control unit may move from the current traversal node up to the pop level and select, as a subsequent traversal node, a sibling node of a node that is traversed at the pop level.

When the second distance is less than the first distance, the control unit may control hierarchical traversal to be performed from the root node toward a pop node positioned at the pop level.

When the second distance is less than the first distance, the control unit may move from the root node to be before the pop level and select, as a subsequent traversal node, a node that is not traversed among nodes of the pop level.

The hierarchical acceleration structure traversing apparatus may further include a selecting unit to select, as the pop level, the largest level among levels having a trail value of "0" when the current traversal node is the leaf node.

In the case of determining a restart node, the control unit may change the trail value of the pop level to "1" and may change all of the trail values of levels greater than the pop level to "0".

The leaf node and the pop node may include a parent node pointer.

The foregoing and/or other aspects are achieved by providing a method of traversing a hierarchical acceleration structure, the method including determining whether a current traversal node is a leaf node; calculating a first distance from the current traversal node to a pop level and a second distance from a root node to the pop level when the current traversal node is the leaf node; and determining a hierarchical traversal restarting position by comparing the first distance and the second distance.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates a tree traversal algorithm according to embodiments;

FIG. 3 illustrates an example of applying a bounding volume hierarchy (BVH) hierarchical traversal structure to a node data structure according to embodiments;

DETAILED DESCRIPTION

Figure 1:
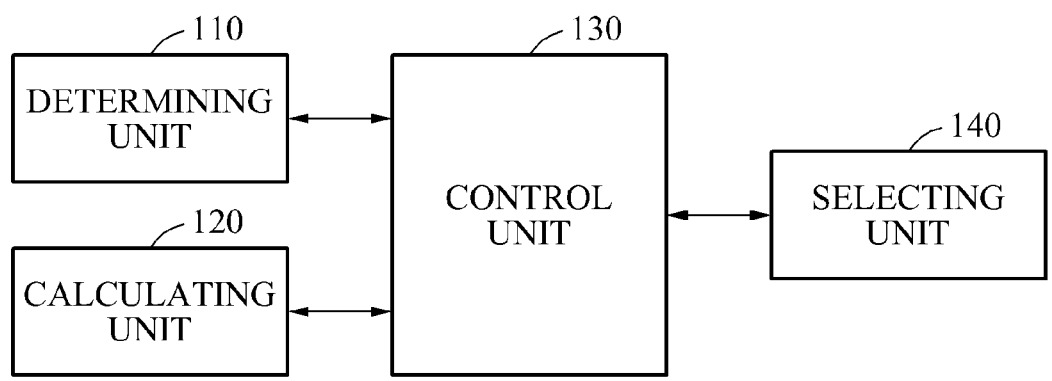
FIG. 1 illustrates a configuration of an apparatus for traversing a hierarchical acceleration structure according to embodiments.

Reference will now be made in detail to embodiments, examples of which are illustrated in the accompanying drawings, wherein like reference numerals refer to like elements throughout. Embodiments are described below to explain the present disclosure by referring to the figures.

Terminologies used herein are defined to appropriately describe the embodiments and thus, may be changed depending on a user, the intent of an operator, or a custom. Accordingly, the terminologies must be defined based on the following overall description of the embodiments.

An apparatus for traversing a hierarchical acceleration structure (hereinafter, a hierarchical acceleration structure traversing apparatus) according to embodiments may apply a hierarchical acceleration structure in order to find the closest primitive that intersects a ray in a ray tracing application.

The hierarchical acceleration structure traversing apparatus may employ a hierarchical acceleration structure, such as a k-dimensional tree (kd-tree), a bounding volume hierarchy (BVH), and a grid, for example.

By employing the kd-tree, the hierarchical acceleration structure traversing apparatus may apply the quickest intersection calculation acceleration data structure with respect to a static scene.

The hierarchical acceleration structure traversing apparatus may apply, to a dynamic scene, a structure, such as the BVH and the grid, for example, which may be further quickly configured.

An element requiring a relatively large amount of calculation in terms of performance of ray tracing may be generation and traversal of a hierarchical acceleration structure in which primitives to be rendered are spatially divided.

Another element requiring a relatively large amount of calculation in terms of performance of ray tracing may be an intersection test between a ray and a primitive.

In the case of performing traversal of a hierarchical acceleration structure and an intersection test, the hierarchical acceleration structure traversing apparatus may use a stack in order to store node information to be processed.

In the case of using hardware or a graphics processing unit (GPU) in order to simultaneously process a large number of rays, the hierarchical acceleration structure traversing apparatus may maintain the number of stacks corresponding to the number of rays.

When the use of a stack is constrained due to the limited storage space or bandwidth, the hierarchical acceleration structure traversing apparatus may not perform a stack operation by applying a stackless algorithm.

The hierarchical acceleration structure traversing apparatus may also apply a short stack algorithm that replaces a stack operation using a fixed size buffer.

In the case of reaching an end node while performing traversal, the hierarchical acceleration structure traversing apparatus may restart the traversal from a root node in order to find a node that is not yet traversed.

In the case of applying a BVH tree, the hierarchical acceleration structure traversing apparatus may apply a stackless algorithm or a short stack algorithm using a restart trail method.

The hierarchical acceleration structure traversing apparatus may further effectively apply a restart trail method instead of using a stack with respect to traversal of a hierarchical acceleration structure and an intersection test.

FIG. 1 illustrates a configuration of an apparatus for traversing a hierarchical acceleration structure according to embodiments.

Referring to FIG. 1, the hierarchical acceleration structure traversing apparatus according to embodiments may include a determining unit 110, a calculating unit 120, and a control unit 130.

The hierarchical acceleration structure traversing apparatus may determine whether a current traversal node is a leaf node using the determining unit 110. Herein, the current traversal node denotes a node currently being traversed.

When the current traversal node is the leaf node, the hierarchical acceleration structure traversing apparatus may calculate a first distance from the current traversal node to a pop level using the calculating unit 120.

When the current traversal node is the leaf node, the hierarchical acceleration structure traversing apparatus may calculate a second distance from a root node to the pop level using the calculating unit 120.

The hierarchical acceleration structure traversing apparatus may determine a hierarchical traversal restarting position by comparing the first distance to the second distance using the control unit 130.

As an example, when the pop level is positioned to be closer to a current traversal node than a root node, the hierarchical acceleration structure traversing apparatus may determine the current traversal node as the hierarchical traversal restarting position.

That is, when the first distance is less than the second distance, the control unit 130 may determine the current traversal node as the hierarchical traversal restarting position.

As an example, when the pop level is positioned to be closer to the root node than the current traversal node, the hierarchical acceleration structure traversing apparatus may determine the root node as the hierarchical traversal restarting position.

That is, when the second distance is less than the first distance, the control unit 130 may determine the root node as the hierarchical traversal restarting position.

The control unit 130 may determine a hierarchical traversal direction by comparing the first distance to the second distance.

As an example, when the pop level is positioned to be closer to the current traversal node than the root node, the hierarchical acceleration structure traversing apparatus may perform hierarchical traversal from the current traversal node toward a pop node positioned at the pop level.

That is, when the first distance is less than the second distance, the control unit 130 may control hierarchical traversal to be performed from the current traversal node toward the pop node positioned at the pop level.

When the pop level is positioned to be closer to the current traversal node than the root node, the hierarchical acceleration structure traversing apparatus may select, as a subsequent traversal node, a sibling node positioned at the pop level. Herein, the subsequent traversal node denotes a node to be subsequently traversed.

That is, when the first distance is less than the second distance, the control unit 130 may move a pointer from the current traversal node up to the pop level and may select, as the subsequent traversal node, a sibling node of a node that is traversed at the pop level.

As an example, when the pop level is positioned to be closer to the root node than the current traversal node, the hierarchical acceleration structure traversing apparatus may perform hierarchical traversal from the root node toward the pop node positioned at the pop level.

That is, when the second distance is less than the first distance, the control unit 130 may control hierarchical traversal to be performed from the root node toward the pop node positioned at the pop level.

When the pop level is positioned to be closer to the root node than the current traversal node, the hierarchical acceleration structure traversing apparatus may select, as the subsequent traversal node, a node positioned below the root node.

That is, when the second distance is less than the first distance, the control unit 130 may move from the root node to be before the pop level and may select, as the subsequent traversal node, a node that is not traversed among nodes of the pop level.

When the current traversal node is the leaf node, the hierarchical acceleration structure traversing apparatus may further include a selecting unit 140 to select, as the pop level, the largest level among levels having a first predetermined trail value. The first predetermined trail value may have a trail value of "0".

In the case of determining a restart node by selecting the pop level, the hierarchical acceleration structure traversing apparatus may change the trail value of the pop level to a second predetermined trail value, which may be "1", and may change all of the trail values of levels greater than the pop level to the first predetermined trail value, which may be "0", using the control unit 130.

The leaf node and the pop node may include a parent node pointer.

FIG. 2 illustrates a tree traversal algorithm according to embodiments.

Referring to FIG. 2, the hierarchical acceleration structure traversing apparatus according to embodiments may provide a basic tree traversal operation and a stack pop tree traversal operation 210.

The hierarchical acceleration structure traversing apparatus may retrieve the largest level having a trail value of "0" through a stack pop operation and may set the retrieved level as a pop level.

The hierarchical acceleration structure traversing apparatus may set a trail value of the set pop level to "1".

The hierarchical acceleration structure traversing apparatus may set all of the trail values after the pop level to "0".

When a short stack is empty, the hierarchical acceleration structure traversing apparatus may calculate a first distance from a current traversal node to the pop level and a second distance from a root node to the pop level. When the pop level is positioned to be closer to a current level than a root level, the hierarchical acceleration structure traversing apparatus may move a pointer up to the pop level from the current traversal node toward a parent node.

The hierarchical acceleration structure traversing apparatus may move a pointer up to the pop level from the current traversal node toward the parent node and then may select, as a subsequent traversal node, a sibling node of a pop node positioned at the pop level.

When the short stack is empty, the hierarchical acceleration structure traversing apparatus may calculate the first distance and the second distance. When the pop level is positioned to be closer to the root level than the current level, the hierarchical acceleration structure traversing apparatus may set the current traversal node as the root node.

When the subsequent traversal node is set as the root node, the hierarchical acceleration structure traversing apparatus may set the current level to "0" and may restart the hierarchical traversal.

On the other hand, when the short stack is not empty, the hierarchical acceleration structure traversing apparatus may load a node from the short stack and may set the loaded node as the subsequent traversal node.

When the node is loaded from the short stack and is set as the subsequent traversal node, the hierarchical acceleration structure traversing apparatus may set the current level as the pop level.

FIG. 3 illustrates an example of applying a BVH hierarchical traversal structure to a node data structure according to embodiments.

Referring to FIG. 3, the hierarchical acceleration structure traversing apparatus according to embodiments may use the BVH hierarchical traversal structure. However, it is only an example and thus, the embodiments are not limited thereto.

A hierarchical traversal structure applied to the hierarchical acceleration structure traversing apparatus may have three-dimensional (3D) bounding box coordinates and pointers of two child nodes of a corresponding node.

The hierarchical traversal structure applied to the hierarchical acceleration structure traversing apparatus may have a pointer of a parent node for moving upward on a tree.

FIG. 4 through FIG. 7 illustrate examples of a tree traversal operation according to embodiments.

Referring to FIG. 4 through 7, it is assumed that r denotes a root node, c denotes a current traversal node, and p denotes a pop node. Also, it is assumed that number "0" or "1" on the left side of a tree denotes a trail value of a corresponding level.

Because a trail value is a value set by a parent node, the trail value is indicated on an upper node of each node.

Figure 4:
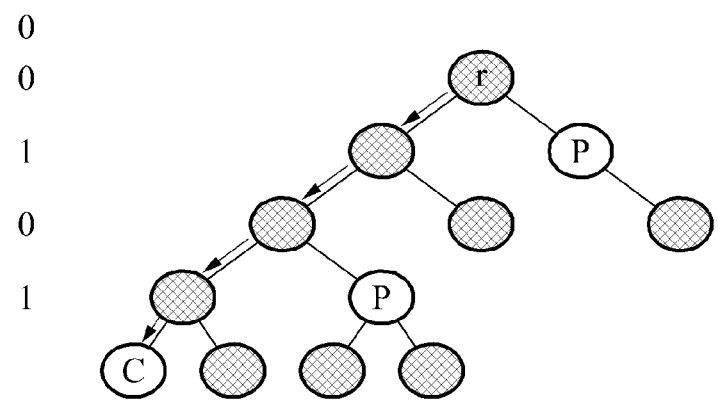
FIG. 4 illustrates a tree traversal structure before a stack pop according to embodiments.

FIG. 4 illustrates a tree traversal structure before a stack pop according to embodiments.

Referring to FIG. 4, because a current traversal node is a leaf node, the hierarchical acceleration structure traversing apparatus may pop a stack.

Figure 5:
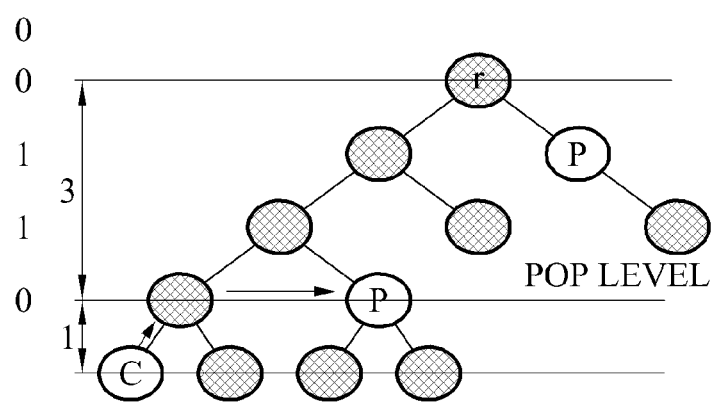
FIG. 5 illustrates a tree traversal structure after a stack pop according to embodiments.

FIG. 5 illustrates a tree traversal structure after a stack pop according to embodiments.

Referring to FIG. 5, in the case of popping the stack of FIG. 4, the hierarchical acceleration structure traversing apparatus may select, as a pop level, a level of a pop node having the largest level among levels having a trail value of "0".

When the pop level is selected, the hierarchical acceleration structure traversing apparatus may change the trail value of the selected pop node to "1" and may change all of the trail values of levels greater than the selected pop level to "0".

Because the pop level is positioned to be closer to a current traversal node than a root node, the hierarchical acceleration structure traversing apparatus may move a pointer up to the pop node from the current traversal node toward a parent node.

Figure 6:
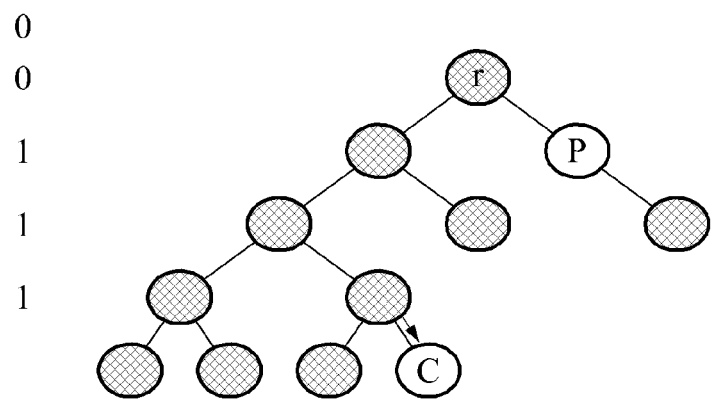
FIG. 6 illustrates tree traversal structure before a stack pop according to embodiments.

FIG. 6 illustrates a tree traversal structure before a stack pop according to embodiments.

Referring to FIG. 6, because a current traversal node is a leaf node, the hierarchical acceleration structure traversing apparatus may pop a stack.

Figure 7:
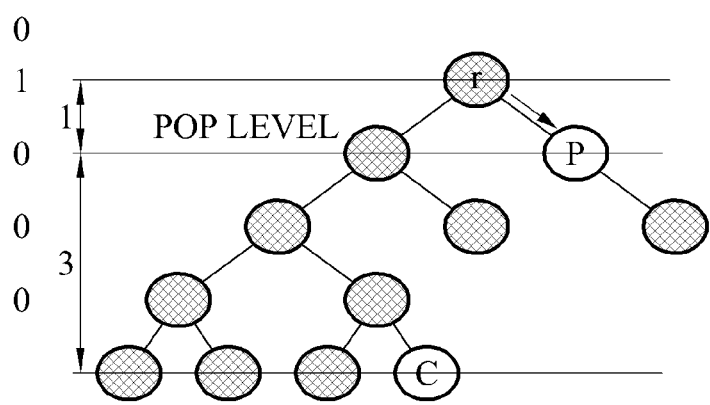
FIG. 7 illustrates a tree traversal structure after a stack pop according to embodiments.

FIG. 7 illustrates a tree traversal structure after a stack pop according to embodiments.

Referring to FIG. 7, in the case of popping the stack of FIG. 6, the hierarchical acceleration structure traversing apparatus may select, as a pop level, a level of a pop node having the largest level among levels having a trail value of "0".

When the pop level is selected, the hierarchical acceleration structure traversing apparatus may change the trail value of the selected pop node to "1" and may change all of the trail values of levels greater than the selected pop level to "0".

Because the pop level is positioned to be closer to a root node than a current traversal node, the hierarchical acceleration structure traversing apparatus may select the root node as a subsequent traversal node and may restart the traversal.

Hereinafter, a method of traversing a hierarchical acceleration structure according to embodiments will be described.

Figure 8:
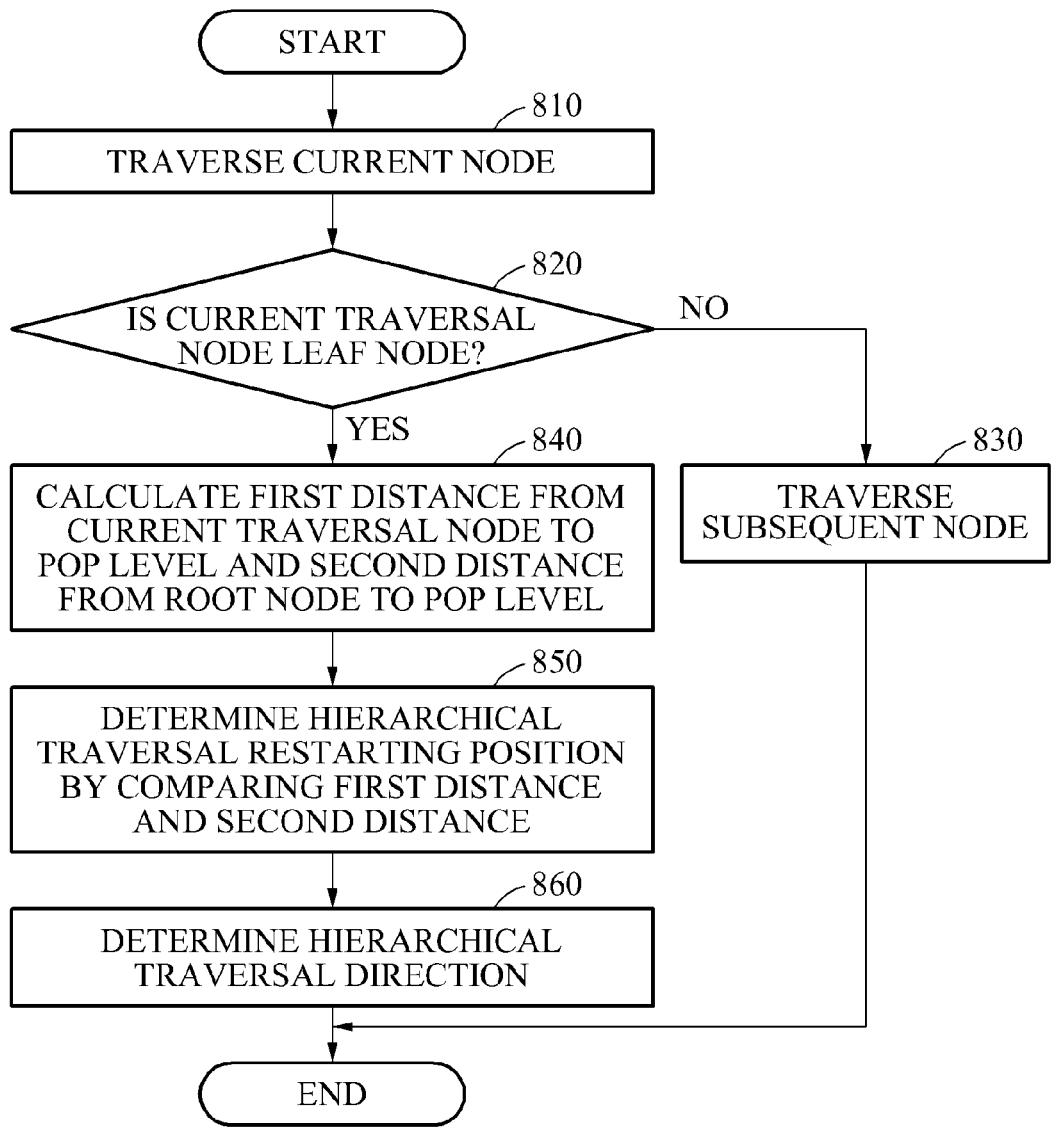
FIG. 8 illustrates a method of traversing a hierarchical acceleration structure according to embodiments.

FIG. 8 illustrates a method of traversing a hierarchical acceleration structure according to embodiments.

In operation 810, the hierarchical acceleration structure traversing apparatus may traverse a current node according to a hierarchical traversal algorithm.

In operation 820, the hierarchical acceleration structure traversing apparatus may determine whether the current traversal node is a leaf node.

When the current traversal node is not the leaf node, the hierarchical acceleration structure traversing apparatus may traverse a subsequent node according to the hierarchical traversal algorithm in operation 830.

On the other hand, when the current traversal node is the leaf node, the hierarchical acceleration structure traversing apparatus may calculate a first distance from the current traversal node to a pop level and a second distance from a root node to the pop level in operation 840.

The hierarchical acceleration structure traversing apparatus may determine a hierarchical traversal restarting position by comparing the first distance and the second distance in operation 850.

As an example, when the pop level is positioned to be closer to the current traversal node than the root node, the hierarchical acceleration structure traversing apparatus may determine the current traversal node as the hierarchical traversal restarting position.

That is, when the first distance is less than the second distance, the hierarchical acceleration structure traversing apparatus may determine the current traversal node as the hierarchical traversal restarting position.

As an example, when the pop level is positioned to be closer to the root node than the current traversal node, the hierarchical acceleration structure traversing apparatus may determine the root node as the hierarchical traversal restarting position.

That is, when the second distance is less than the first distance, the hierarchical acceleration structure traversing apparatus may determine the root node as the hierarchical traversal restarting position.

In operation 860, the hierarchical acceleration structure traversing apparatus may determine a hierarchical traversal direction by comparing the first distance and the second distance.

As an example, when the pop level is positioned to be closer to the current traversal node than the root node, the hierarchical acceleration structure traversing apparatus may perform hierarchical traversal from the current traversal node toward a pop node positioned at the pop level.

That is, when the first distance is less than the second distance, the hierarchical acceleration structure traversing apparatus may control the hierarchical traversal to be performed from the current traversal node toward the pop node positioned at the pop level.

When the pop level is positioned to be closer to the current traversal node than the root node, the hierarchical acceleration structure traversing apparatus may select, as a subsequent traversal node, a sibling node positioned at the pop level.

That is, when the first distance is less than the second distance, the hierarchical acceleration structure traversing apparatus may move from the current traversal node up to the pop level and then may select, as the subsequent traversal node, a sibling node of a node that is traversed at the pop level.

As another example, when the pop level is positioned to be closer to the root node than the current traversal node, the hierarchical acceleration structure traversing apparatus may perform hierarchical traversal from the root node toward the pop node positioned at the pop level.

That is, when the second distance is less than the first distance, the hierarchical acceleration structure traversing apparatus may control the hierarchical traversal to be performed from the root node toward the pop node positioned at the pop level.

When the pop level is positioned to be closer to the root node than the current traversal node, the hierarchical acceleration structure traversing apparatus may select, as the subsequent traversal node, a node positioned below the root node.

That is, when the second distance is less than the first distance, the hierarchical acceleration structure traversing apparatus may move from the root node to be before the pop level and may select, as the subsequent traversal node, a node that is not traversed among nodes of the pop level.

When the current traversal node is the leaf node, the hierarchical acceleration structure traversing apparatus may select, as the pop level, the largest level among levels having a trail value of "0".

In the case of determining a restart node, the hierarchical acceleration structure traversing apparatus may change the trail value of the pop level to "1", and may change all of the trail values of levels greater than the pop level to "0".

According to embodiments, the hierarchical acceleration structure traversing apparatus may traverse a hierarchical acceleration structure without using a stack.

According to embodiments, the hierarchical acceleration structure traversing apparatus may decrease cost used for restarting hierarchical traversal, thereby more quickly performing the hierarchical traversal.

According to embodiments, in the case of traversing a hierarchical acceleration structure using a hierarchical traversal restart method in a system in which use of a stack is limited, the hierarchical acceleration structure traversing apparatus may determine a hierarchical traversal restarting position and direction based on a distance from a pop level.

According to embodiments, in the case of generating a hierarchical acceleration structure, the hierarchical acceleration structure traversing apparatus may determine a hierarchical traversal restarting direction by adding a parent node pointer to each node.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for traversing a hierarchical acceleration structure, the apparatus comprising:
   a determining unit configured to determine whether a current traversal node is a leaf node;
   a calculating unit configured to calculate a first distance from the current traversal node to a pop level and a second distance from a root node to the pop level when the current traversal node is the leaf node; and
   a control unit configured to determine a hierarchical traversal restarting position by comparing the first distance and the second distance: and
   a selecting unit to select, as the pop level, the largest level among levels having a trail value of a first predetermined value when the current traversal node is the leaf node.

2. The apparatus of claim 1, wherein when the first distance is less than the second distance, the control unit determines the current traversal node as the hierarchical traversal restarting position.

3. The apparatus of claim 1, wherein when the second distance is less than the first distance, the control unit is further configured to determine the root node as the hierarchical traversal restarting position.

4. The apparatus of claim 1, wherein when the first distance is less than the second distance, the control unit is further configured to control hierarchical traversal to be performed from the current traversal node toward a pop node positioned at the pop level.

5. The apparatus of claim 1, wherein when the first distance is less than the second distance, the control unit is further configured to move from the current traversal node up to the pop level and to select, as a subsequent traversal node, a sibling node of a node that is traversed at the pop level.

6. The apparatus of claim 1, wherein when the second distance is less than the first distance, the control unit is further configured to control hierarchical traversal to be performed from the root node toward a pop node positioned at the pop level.

7. The apparatus of claim 1, wherein when the second distance is less than the first distance, the control unit is further configured to move from the root node to be before the pop level and to select, as a subsequent traversal node, a node that is not traversed among nodes of the pop level.

8. The apparatus of claim 1, wherein in the case of determining a restart node, the control unit changes the trail value of the pop level to a second predetermined value and changes all of the trail values of levels greater than the pop level to a first predetermined value.

9. The apparatus of claim 4, wherein the leaf node and the pop node comprise a parent node pointer.

10. A method of traversing a hierarchical acceleration structure, the method comprising:
    determining, by a processor, whether a current traversal node is a leaf node;
    calculating a first distance from the current traversal node to a pop level and a second distance from a root node to the pop level when the current traversal node is the leaf node;
    determining a hierarchical traversal restarting position by comparing the first distance and the second distance; and
    selecting, as the pop level, the largest level among levels having a trail value of a first predetermined value when the current traversal node is the leaf node.

11. The method of claim 10, further comprising:
    determining the current traversal node as the hierarchical traversal restarting position when the first distance is less than the second distance; and
    determining the root node as the hierarchical traversal restarting position when the second distance is less than the first distance.

12. The method of claim 10, further comprising:
    controlling hierarchical traversal to be performed from the current traversal node toward a pop node positioned at the pop level when the first distance is less than the second distance; and
    controlling hierarchical traversal to be performed from the root node toward the pop node positioned at the pop level when the second distance is less than the first distance.

13. The method of claim 10, further comprising:
    moving from the current traversal node up to the pop level and selecting, as a subsequent traversal node, a sibling node of a node that is traversed at the pop level when the first distance is less than the second distance; and
    moving from the root node to be before the pop level and selecting, as the subsequent traversal node, a node that is not traversed among nodes of the pop level when the second distance is less than the first distance.

14. The method of claim 10, further comprising
    changing the trail value of the pop level to a second predetermined value and changing all of the trail values of levels greater than the pop level to the first predetermined value in the case of determining a restart node.

15. The method of claim 12, wherein each node includes a parent node pointer.

16. A non-transitory computer-readable medium comprising a program for instructing a computer to perform the method of claim 10.

17. The method of claim 14, wherein the first predetermined value is "0" and the second predetermined value is "1".

* * * * *